United States Patent
Wada (10) Patent No.: US 10,075,629 B2
(45) Date of Patent: Sep. 11, 2018

(54) ELECTRONIC DEVICE FOR CAPTURING IMAGES WHILE USER LOOKS DIRECTLY AT CAMERA

(71) Applicant: Sharp Kabushiki Kaisha, Osaka-shi, Osaka (JP)

(72) Inventor: Hiroshi Wada, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 143 days.

(21) Appl. No.: 15/108,333

(22) PCT Filed: Jan. 14, 2015

(86) PCT No.: PCT/JP2015/050719
§ 371 (c)(1),
(2) Date: Jun. 27, 2016

(87) PCT Pub. No.: WO2015/115173
PCT Pub. Date: Aug. 6, 2015

(65) Prior Publication Data
US 2016/0323503 A1 Nov. 3, 2016

(30) Foreign Application Priority Data
Jan. 30, 2014 (JP) ................. 2014-015474

(51) Int. Cl.
*H04N 5/232* (2006.01)
*H04M 1/725* (2006.01)

(52) U.S. Cl.
CPC .... *H04N 5/23219* (2013.01); *H04M 1/72522* (2013.01); *H04N 5/23216* (2013.01);
(Continued)

(58) Field of Classification Search
CPC .......... H04N 5/23219; H04N 5/23216; H04N 5/23222; H04N 5/23293; H04N 1/00411;
(Continued)

(56) References Cited

U.S. PATENT DOCUMENTS

| 2009/0060291 A1 | 3/2009 | Ohtani et al. |
| 2014/0118600 A1 | 5/2014 | Son et al. |

(Continued)

FOREIGN PATENT DOCUMENTS

| CN | 101383000 A | 3/2009 |
| CN | 103049175 A | 4/2013 |

(Continued)

OTHER PUBLICATIONS

Machine english Translation of Ishihara, JP 2013-121097 A (Jun. 17, 2013) (Year: 2013).*

(Continued)

*Primary Examiner* — Nelson D. Hernández Hernández
(74) *Attorney, Agent, or Firm* — Keating & Bennett, LLP (57) ABSTRACT

An electronic device is provided to allow a user to take a selfie while the user looks directly at the camera. A smartphone includes: a monitor; a camera provided at a display surface side of the monitor; and a CPU configured to control the smartphone. The CPU includes a display control unit configured to display, during image capturing of a subject by the camera, an object in a first display area on the monitor in order to lead gaze of a user of the smartphone to the camera, the first display area being located within a predetermined range from a location of the camera of the smartphone.

4 Claims, 9 Drawing Sheets

(52) U.S. Cl.
CPC ..... *H04N 5/23222* (2013.01); *H04N 5/23293* (2013.01); *H04M 2250/22* (2013.01); *H04M 2250/52* (2013.01)

(58) Field of Classification Search
CPC ............ H04N 1/2125; H04N 13/0484; H04M 1/72522; G03B 2213/025
USPC ........................................ 348/333.02, 333.03
See application file for complete search history.

(56) References Cited

U.S. PATENT DOCUMENTS

| | | | |
|---|---|---|---|
| 2015/0091794 A1* | 4/2015 | Ha | G06F 3/013 345/156 |
| 2015/0109507 A1 | 4/2015 | Li et al. | |

FOREIGN PATENT DOCUMENTS

| | | | |
|---|---|---|---|
| CN | 103795913 A | | 5/2014 |
| CN | 107547800 A | | 1/2018 |
| CN | 107566732 A | | 1/2018 |
| JP | 2000-341560 A | | 12/2000 |
| JP | 2007-116601 A | | 5/2007 |
| JP | 2007-208866 A | | 8/2007 |
| JP | 2013-121097 A | | 6/2013 |
| JP | 2013121097 A | * | 6/2013 |
| JP | 2013-131906 A | | 7/2013 |

OTHER PUBLICATIONS

Official Communication issued in International Patent Application No. PCT/JP2015/050719, dated Apr. 21, 2015.

\* cited by examiner

ELECTRONIC DEVICE FOR CAPTURING IMAGES WHILE USER LOOKS DIRECTLY AT CAMERA

TECHNICAL FIELD

The present disclosure relates to control of an electronic device, more particularly, control of an electronic device having an image capturing function and a touch operation function.

BACKGROUND ART

In recent years, portable electronic devices having an image capturing function have been pervasive, such as smartphones, tablet terminals, and other devices. In the case where a camera is provided on a display device side of an electronic device as a so-called "in-camera", a user of the electronic device can take a selfie, i.e., can capture an image of himself/herself while checking a live view displayed in real time on the display device. When the user takes a selfie, the user tends to stare at the live view rather than the camera, which results in unintended gaze of the user in the captured image.

In order to solve such a problem, Patent Document 1 (Japanese Patent Laying-Open No. 2007-116601) discloses an "image capturing device for capturing an image in which gaze of a subject is in an intended direction while looking at a presentation unit even in the case of taking a selfie in which the image capturing direction of the optical axis in the image capturing is aligned with the display direction of the display unit". The image capturing device stops displaying the live view just before capturing an image, thereby deviating the user's gaze from the live view.

CITATION LIST

Patent Document

PTD 1: Japanese Patent Laying-Open No. 2007-116601

SUMMARY OF INVENTION

Technical Problem

Meanwhile, in a recent small-sized electronic device such as a smartphone, it may be difficult to notice where a camera is provided. Even though the live view is stopped being displayed as in the image capturing device disclosed in Patent Document 1, the user may not notice the location of the camera in the image capturing device. Accordingly, an image cannot be captured with the user looking directly at the camera, which may still result in unintended gaze of the user in the captured image. This arises a demand for a technique for capturing an image of a user with the user looking directly at the camera when taking a selfie.

The present disclosure has been made to solve the above problem and an object in a certain aspect thereof is to provide an electronic device allowing a user to take a selfie with the user looking directly at a camera.

Solution to Problem

According to one embodiment, an electronic device is provided which includes: a monitor; a camera provided at a display surface side of the monitor; and a control device configured to control the electronic device. The control device includes display control means for displaying, during image capturing of a subject by the camera, an object in a first display area on the monitor in order to lead gaze of a user of the electronic device to the camera, the first display area being located within a predetermined range from a location of the camera of the electronic device.

Advantageous Effects of Invention

In a certain aspect, the electronic device allows a user to take a selfie with the user looking directly at the camera.

The foregoing and other objects, features, aspects and advantages of the present invention will become more apparent from the following detailed description of the present invention when taken in conjunction with the accompanying drawings.

DESCRIPTION OF EMBODIMENTS

The following describes the present embodiment with reference to figures. In the description below, the same reference characters are given to the same parts and components. Their names and functions are also the same. Hence, they are not described in detail repeatedly.

It should be noted that the following describes details of a smartphone, which serves as an exemplary electronic device; however, the electronic device is not limited to the smartphone. Examples of the electronic device include a tablet terminal, a digital camera, a game machine, an electronic dictionary, a personal computer, a PDA (Personal Digital Assistants), and other portable terminal devices allowing one to take a selfie. Moreover, below-described embodiments may be selectively employed in combination.

First Embodiment

[Overview]

Figure 1:
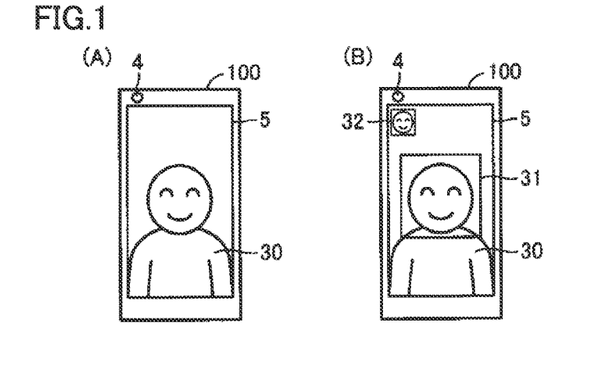
FIG. 1 shows a manner of display in a smartphone according to a first embodiment.

With reference to FIG. 1, the following describes an overview of a smartphone 100 according to a first embodiment. FIG. 1 shows a manner of display in smartphone 100 when a user is taking a selfie.

As shown in FIG. 1 (A), smartphone 100 includes a camera 4 and a monitor 5. Monitor 5 displays, in real time, a live view obtained through image capturing of a user 30 of smartphone 100. Camera 4 is provided at the display surface side of monitor 5, whereby user 30 can take a selfie while checking the live view.

When taking a selfie, user 30 tends to look at the live view displayed on monitor 5, rather than camera 4. If an image is captured when user 30 does not look directly at camera 4, the captured image includes unnatural gaze of the user.

As shown in FIG. 1 (B), during image capturing of a subject by camera 4, smartphone 100 displays an object in an object display area 32 on monitor 5 in order to lead gaze of user 30 to camera 4. Object display area 32 is located within a predetermined range from the location of camera 4. Accordingly, the user stares at the object displayed near the camera, whereby an image can be captured with the user looking directly at camera 4.

Examples of the object include a face image of user 30. By displaying the face image of the user on object display area 32, the user can check his/her facial expression or the like while gazing at camera 4, whereby an image can be captured with the user looking directly at camera 4. This leads to an image including natural and intended gaze of user 30.

It should be noted that the object is not limited to the face image. Examples of the object may include an animation, an icon, an arrow, a button for receiving an image capturing instruction, a live view itself, and the like as described later.

[Hardware Configuration]

Figure 2:
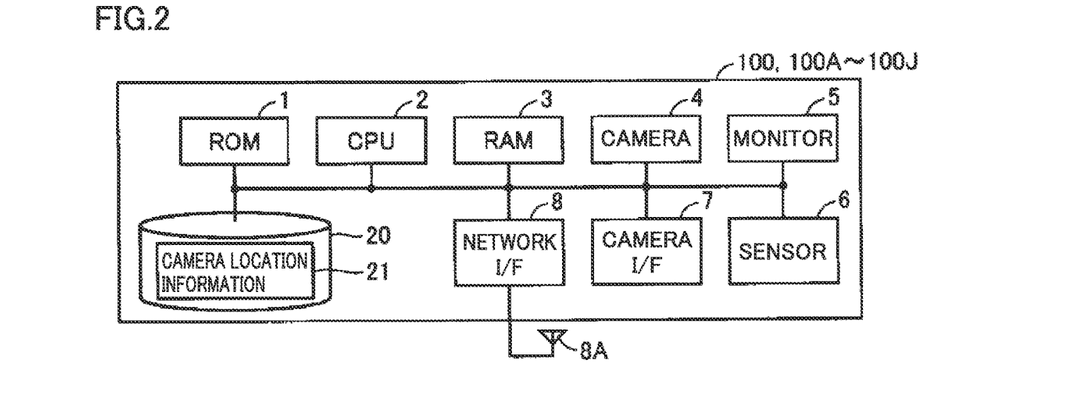
FIG. 2 is a block diagram showing a main hardware configuration of the smartphone according to the first embodiment.

With reference to FIG. 2, the following describes an exemplary hardware configuration of smartphone 100 according to the first embodiment. FIG. 2 is a block diagram showing a main hardware configuration of smartphone 100. As shown in FIG. 2, smartphone 100 includes a ROM (Read Only Memory) 1, a CPU (Central Processing Unit) 2, a RAM (Random Access Memory) 3, camera 4, monitor 5, a sensor 6, a camera interface (I/F) 7, a network interface (I/F) 8, and a storage device 20.

ROM 1 stores an operating system (OS), an initial program (boot program) executed when starting smartphone 100, and the like. CPU 2 controls operations of smartphone 100 by executing various types of programs stored in ROM 1, storage device 20, and the like, such as the operating system and a control program for smartphone 100. RAM 3 functions as a working memory for CPU 2 to execute a program, and temporarily stores various types of data necessary for execution of programs.

Camera 4 includes a lens, a CMOS (Complementary Metal-Oxide Semiconductor) image capturing element or a different image capturing element, and an auto-focusing structure. Monitor 5 displays, as an image, an output from the image capturing element included in camera 4. Moreover, monitor 5 may be configured as a touch panel in combination with a touch sensor (not shown).

Sensor 6 includes an acceleration sensor, an angular velocity sensor, and other sensors for detecting inclination of smartphone 100. Sensor 6 outputs detected results of acceleration, inclination, and the like to CPU 2.

An external camera device is connected to smartphone 100 via camera I/F 7. Camera I/F 7 is USB (Universal Serial Bus), for example. The external camera device can send image data, obtained through image capturing of a subject, to smartphone 100 via camera I/F 7.

Network I/F 8 transmits and receives data to/from other communication devices via an antenna 8A. Examples of the other communication devices include a smartphone, a personal computer, a server device, other electronic devices having a communication function, and the like.

Storage device 20 includes a storage medium such as an eMMC (Embedded Multi Media Card), for example. The eMMC includes a NAND flash memory and a control circuit. Storage device 20 stores a program for implementing various types of processes in accordance with the present embodiment, and the like. Moreover, storage device 20 may store a program such as the operating system. In storage device 20, camera location information 21 is stored which indicates the location of the camera on smartphone 100. Camera location information 21 is indicated as coordinates on smartphone 100, for example.

[Functional Configuration]

Figure 3:
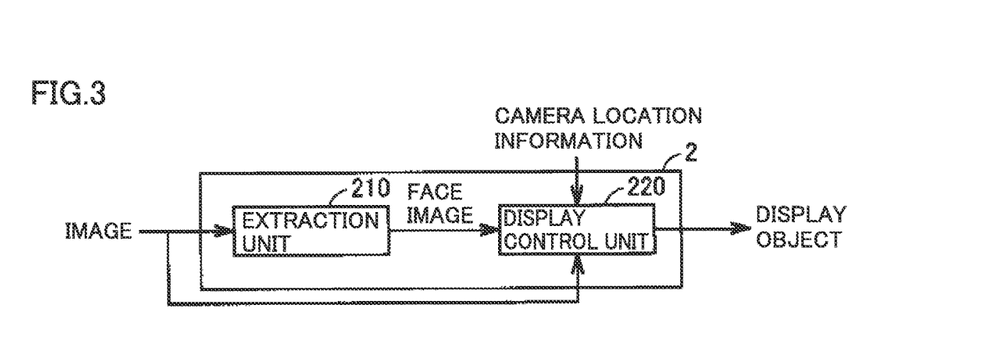
FIG. 3 is a block diagram showing a functional configuration of the smartphone according to the first embodiment.

With reference to FIG. 3, the following describes an exemplary functional configuration of smartphone 100. FIG. 3 is a block diagram showing the functional configuration of smartphone 100. CPU 2 includes an extraction unit 210 and a display control unit 220.

Extraction unit 210 extracts a face image of the user from a live view obtained by camera 4. For example, extraction unit 210 extracts the face image in the following manner a face image previously registered in storage device 20 is regarded as a reference image and search for the reference image in the live view is performed. Extraction unit 210 outputs the extracted face image to display control unit 220.

Display control unit 220 obtains predetermined camera location information 21 on smartphone 100 and determines that object display area 32 is an area located on monitor 5 within a predetermined range from the location on smartphone 100 indicated by camera location information 21. During the image capturing of the subject by camera 4, display control unit 220 displays the live view obtained from camera 4 on monitor 5 at a display area (hereinafter referred to as "live view display area") different from object display area 32, and displays the face image extracted by extraction unit 210 on object display area 32 as the object.

It should be noted that display control unit 220 may determine that object display area 32 is an area, closest to the location indicated by camera location information 21, on the monitor.

[Control Structure]

Figure 4:
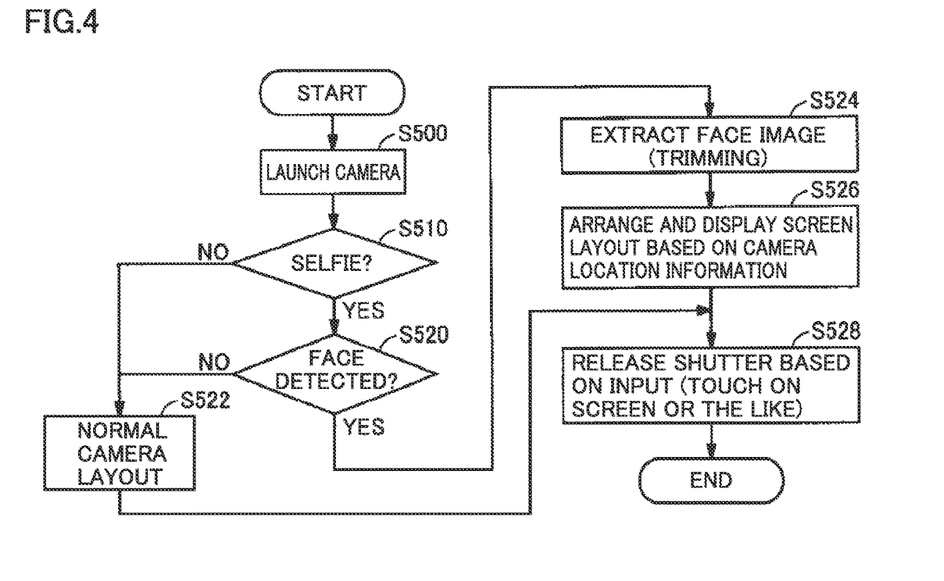
FIG. 4 is a flowchart showing part of a process performed by the smartphone according to the first embodiment.

With reference to FIG. 4, the following describes a control structure of smartphone 100. FIG. 4 is a flowchart showing part of a process performed by smartphone 100. The process of FIG. 4 is implemented by CPU 2 executing a program. In another aspect, part or all of the process may be performed by a circuit element or other hardware.

In a step S500, CPU 2 launches the camera based on an instruction of the user. In a step S510, CPU 2 determines whether or not an image capturing mode is a selfie mode. When CPU 2 determines that the image capturing mode is the selfie mode (YES in step S510), CPU 2 switches the control to a step S520. Otherwise (NO in step S510), CPU 2 switches the control to a step S522.

In step S520, CPU 2 serves as extraction unit 210 to determine whether or not a face image is included in the image obtained from camera 4. When it is determined that the face image is included in the image obtained from camera 4 (YES in step S520), CPU 2 switches the control to a step S524. Otherwise (NO in step S520), CPU 2 switches the control to step S522.

In step S522, CPU 2 displays on monitor 5 a live view obtained through image capturing of the subject, without displaying the object on object display area 32. In step S524, CPU 2 serves as extraction unit 210 to generate a face image based on the captured image. In a certain aspect, CPU 2 generates the face image by cutting out (trimming) the face image from the captured image.

In a step S526, CPU 2 serves as display control unit 220 to arrange a screen layout based on the camera location information and display the layout on monitor 5. In a certain aspect, CPU 2 displays the object on object display area 32 determined in accordance with camera location information 21, and displays on monitor 5 the live view obtained through the image capturing of the subject. In a step S528, CPU 2 performs an image capturing function (releases the shutter of camera 4) based on a touch operation of the user onto monitor 5 configured as a touch panel.

Second Embodiment

Figure 5:
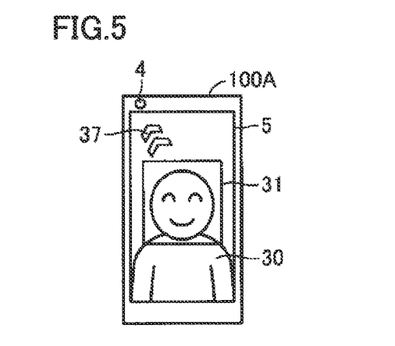
FIG. 5 shows a manner of display in a smartphone according to a second embodiment.

With reference to FIG. 5, the following describes an overview of a smartphone 100A according to a second embodiment. FIG. 5 shows a manner of display in smartphone 100A when a user is taking a selfie. Smartphone 100A is different from smartphone 100 according to the first embodiment in that an arrow image 37 pointing at camera 4 is displayed on the object display area instead of displaying a face image as the object. The other points, such as a hardware configuration, are the same as those in smartphone 100 according to the first embodiment, and therefore are not described repeatedly.

Because the image directly pointing at camera 4 such as arrow image 37 is displayed on the object display area, the user can intuitively know the location at which he/she should gaze.

Third Embodiment

Figure 6:
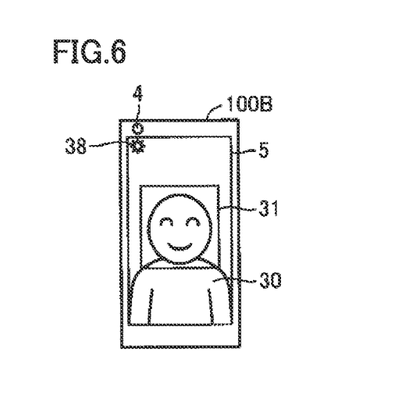
FIG. 6 shows a manner of display in a smartphone according to a third embodiment.

With reference to FIG. 6, the following describes an overview of a smartphone 100B according to a third embodiment. FIG. 6 shows a manner of display in smartphone 100B when a user is taking a selfie. Smartphone 100B is different from smartphone 100 according to the first embodiment in that an icon 38 is displayed on the object display area instead of displaying a face image as the object. The other points, such as a hardware configuration, are the same as those in smartphone 100 according to the first embodiment, and therefore are not described repeatedly.

Even when a face image cannot be displayed on the monitor because the detected display area is narrow, smartphone 100B can lead the gaze of the user to camera 4 by displaying, on the object display area, a relatively small object that can be recognized by the user, such as the icon.

[Control Structure]

Figure 7:
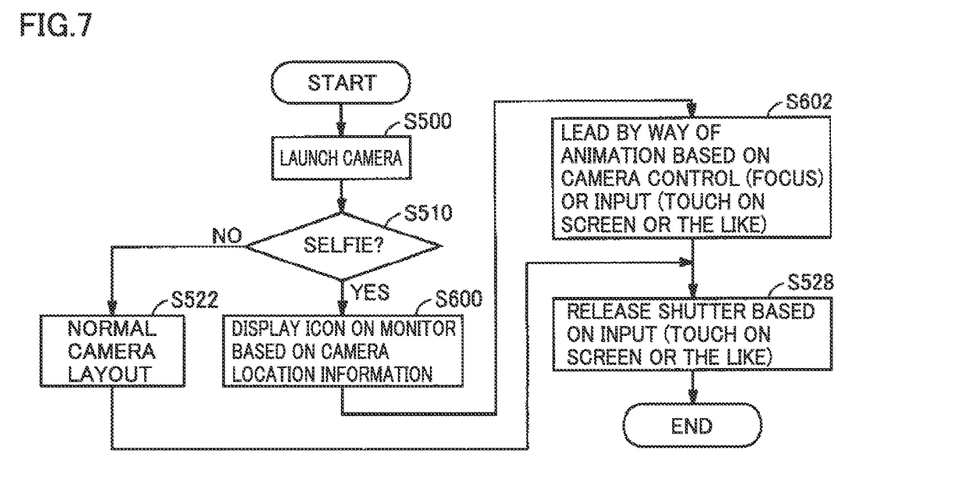
FIG. 7 is a flowchart showing part of a process performed by the smartphone according to the third embodiment.

With reference to FIG. 7, the following describes a control structure of smartphone 100B. FIG. 7 is a flowchart showing part of a process performed by smartphone 100B. The process of FIG. 7 is implemented by CPU 2 executing a program. In a certain aspect, part or all of the process may be performed by a circuit element or other hardware. It should be noted that in steps shown in FIG. 7, the same processes as those in the flowchart shown in FIG. 4 are given the same step numbers. Hence, the same processes will not be repeatedly described.

In a step S600, during image capturing of a subject by camera 4, CPU 2 serves as display control unit 220 to display icon 38 on the object display area determined based on the camera location information, and display on the live view display area the image obtained through the image capturing of the subject.

In a step S602, CPU 2 leads the gaze of the user by way of an animation based on camera control such as focus adjustment or based on a touch operation of the user onto monitor 5 configured as a touch panel as described below.

Fourth Embodiment

Figure 8:
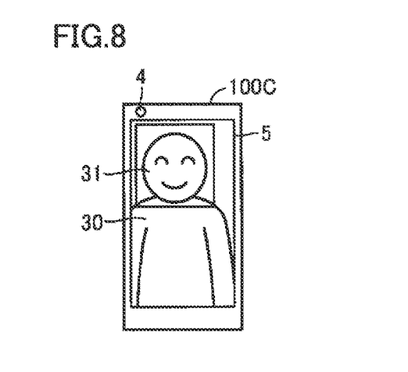
FIG. 8 shows a manner of display in a smartphone according to a fourth embodiment.

With reference to FIG. 8, the following describes an overview of a smartphone 100C according to a fourth embodiment. FIG. 8 shows a manner of display in smartphone 100C when a user is taking a selfie. Smartphone 100C is different from smartphone 100 according to the first embodiment in that instead of displaying, as the object, a face image cut out from a live view, the displayed live view itself is slid such that a face location 31 of the live view comes close to camera 4. The other points are the same as those in smartphone 100 according to the first embodiment, and therefore are not described repeatedly.

According to the present embodiment, smartphone 100C displays the live view itself on the object display area, whereby an image can be captured while the user can gaze at camera 4 and can check his/her facial expression or the like.

Fifth Embodiment

Figure 9:
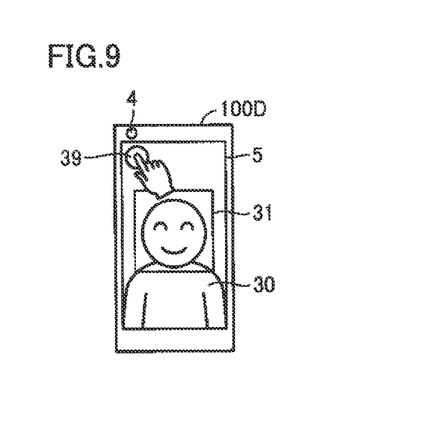
FIG. 9 shows a manner of display in a smartphone according to a fifth embodiment.

With reference to FIG. 9, the following describes an overview of a smartphone 100D according to a fifth embodiment. FIG. 9 shows a manner of display in smartphone 100D when a user is taking a selfie. Smartphone 100D is different from smartphone 100 according to the first embodiment in that a button 39 is displayed on the object display area as the object. Button 39 is configured to permit performance of an image capturing function for storing an image obtained by camera 4 into storage device 20. The other points are the same as those in smartphone 100 according to the first embodiment, and therefore are not described repeatedly.

According to the present embodiment, because button 39 for performing the image capturing function is displayed in the vicinity of camera 4, the user can perform the image capturing function while gazing at button 39. Accordingly, an image can be obtained with user 30 looking directly at camera 4 as intended.

Sixth Embodiment

[Overview]

Figure 10:
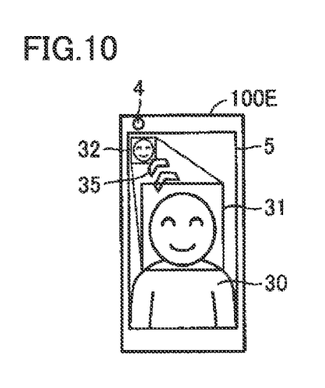
FIG. 10 shows a manner of display in a smartphone according to a sixth embodiment.

With reference to FIG. 10, the following describes an overview of a smartphone 100E according to a sixth embodiment. FIG. 10 shows a manner of display in smartphone 100E when a user is taking a selfie. Smartphone 100E is different from smartphone 100 according to the first embodiment in that an animation 35 is displayed on a display area between face location 31 and camera 4 in order to lead the gaze of user 30 from face location 31 toward camera 4.

Smartphone 100E can lead the gaze of the user from face location 31 to camera 4 by displaying the animation on monitor 5 to start from face location 31 at which the user tends to stare. It should be noted that the hardware configuration of smartphone 100E according to the sixth embodiment is the same as the configuration shown in FIG. 2. Hence, the hardware configuration is not described repeatedly.

[Control Structure]

Figure 11:
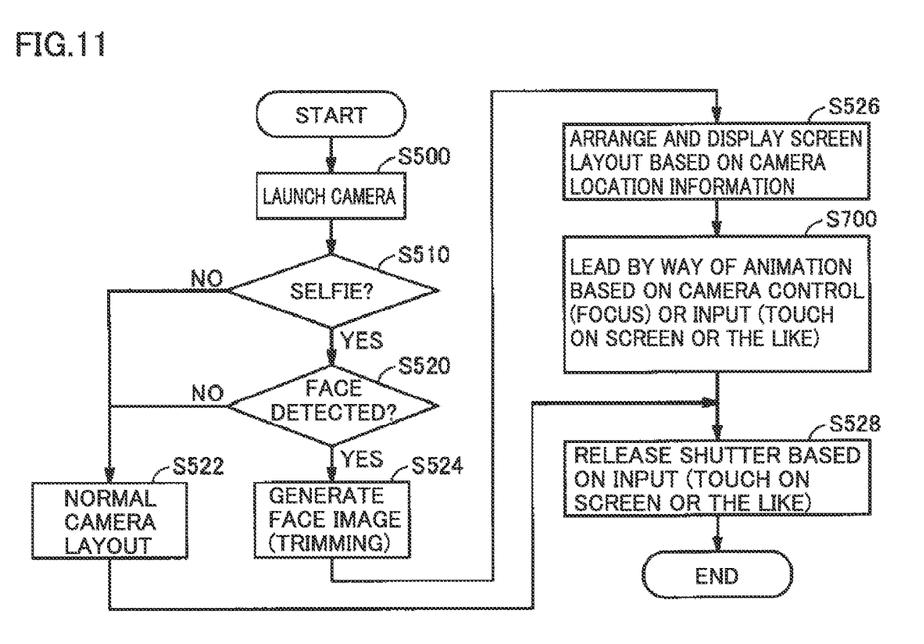
FIG. 11 is a flowchart showing part of a process performed by the smartphone according to the sixth embodiment.

With reference to FIG. 11, the following describes a control structure of smartphone 100E. FIG. 11 is a flowchart showing part of a process performed by smartphone 100E. The process of FIG. 11 is implemented by CPU 2 executing a program. In a certain aspect, part or all of the process may be performed by a circuit element or other hardware. It should be noted that in steps shown in FIG. 11, the same processes as those in the flowchart shown in FIG. 4 are given the same step numbers. Hence, the same processes will not be repeatedly described.

In a step S700, during the image capturing of the subject by camera 4, CPU 2 serves as display control unit 220 to display animation 35 on the display area between camera 4 and face location 31 of user 30 in the live view displayed on monitor 5. It should be noted that CPU 2 may display the animation at a predetermined timing. For example, CPU 2 may display animation 35 based on camera 4 coming into focus. In a certain aspect, smartphone 100E may display animation 35 during adjustment of focus. In another aspect, smartphone 100E may display animation 35 based on a touch operation of the user onto monitor 5.

Seventh Embodiment

[Overview]

Figure 12:
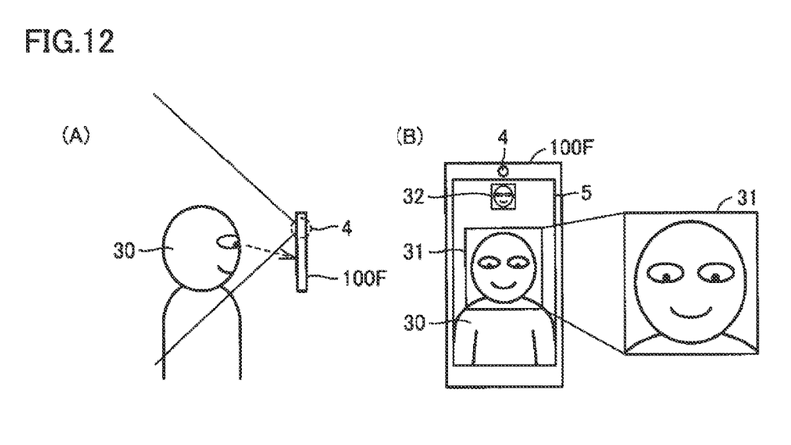
FIG. 12 shows a manner of display in a smartphone according to a seventh embodiment.

With reference to FIG. 12, the following describes a smartphone 100F according to a seventh embodiment. FIG. 12 shows a manner of display in smartphone 100F when a user is taking a selfie. Smartphone 100F is different from smartphone 100 according to the first embodiment in that a camera location is estimated based on gaze of the user.

It should be noted that the hardware configuration of smartphone 100F according to the seventh embodiment is the same as that of the configuration shown in FIG. 2 except that storage device 20 may not have camera location information 21. Hence, the hardware configuration is not described repeatedly.

As shown in FIG. 12 (A), user 30 is taking a selfie using smartphone 100F having camera 4 provided at its upper end. On this occasion, user 30 tends to stare at his/her face displayed on monitor 5 and his/her gaze is accordingly directed opposite to the location of the camera. For example, as shown in FIG. 12 (B), when camera 4 is provided at the upper portion of smartphone 100F, the gaze of the user is highly likely to be directed downward. Smartphone 100F estimates that the camera is located opposite to the gaze of the user, and displays an object (such as a face image) on object display area 32, which is located within a predetermined range from the estimated camera location.

Since smartphone 100F can estimate the camera location based on the gaze of the user, smartphone 100F can lead the gaze of the user to camera 4 even when no camera location information can be obtained or even when no camera location information is defined. Moreover, smartphone 100F can be employed for electronic devices for which no camera location is defined, and therefore can be employed for any device.

[Functional Configuration]

Figure 13:
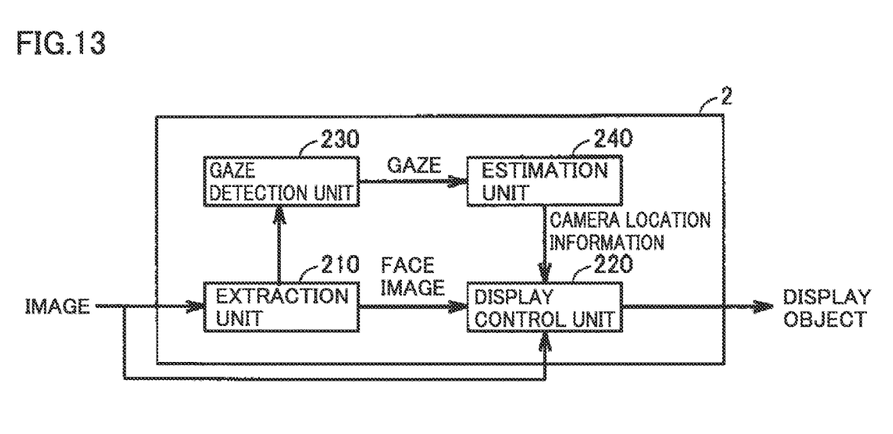
FIG. 13 is a block diagram showing a functional configuration of the smartphone according to the seventh embodiment.

With reference to FIG. 13, the following describes an exemplary functional configuration of smartphone 100F. FIG. 13 is a block diagram showing the functional configuration of smartphone 100F. It should be noted that the same configurations as the configurations shown in FIG. 3 are given the same numbers. Hence, the same configurations are not repeatedly described.

CPU 2 includes extraction unit 210, display control unit 220, a gaze detection unit 230, and an estimation unit 240. Gaze detection unit 230 detects the gaze of the user at smartphone 100F based on a face image extracted by extraction unit 210. For example, gaze detection unit 230 detects the gaze of the user based on locations of the pupils of the user in the face image. As one example, gaze detection unit 230 detects the gaze of the user as coordinates on smartphone 100F.

In a certain aspect, gaze detection unit 230 detects the gaze by way of eye tracking. Alternatively, gaze detection unit 230 may detect the gaze through a video image of the eyeballs of the user or through image processing of a still image resulting from image capturing of the user. Gaze detection unit 230 outputs the detected gaze to estimation unit 240.

Estimation unit 240 estimates the location of camera 4 in smartphone 100F based on the gaze output by gaze detection unit 230. For example, estimation unit 240 estimates that the location of camera 4 is opposite to the gaze in terms of direction and is on smartphone 100F at a frame area where monitor 5 is not provided.

Display control unit 220 determines that the object display area is an area on monitor 5 within a predetermined range from the location of camera 4 estimated by estimation unit 240, and displays an object (for example, a face image) on the object display area.

[Control Structure]

Figure 14:
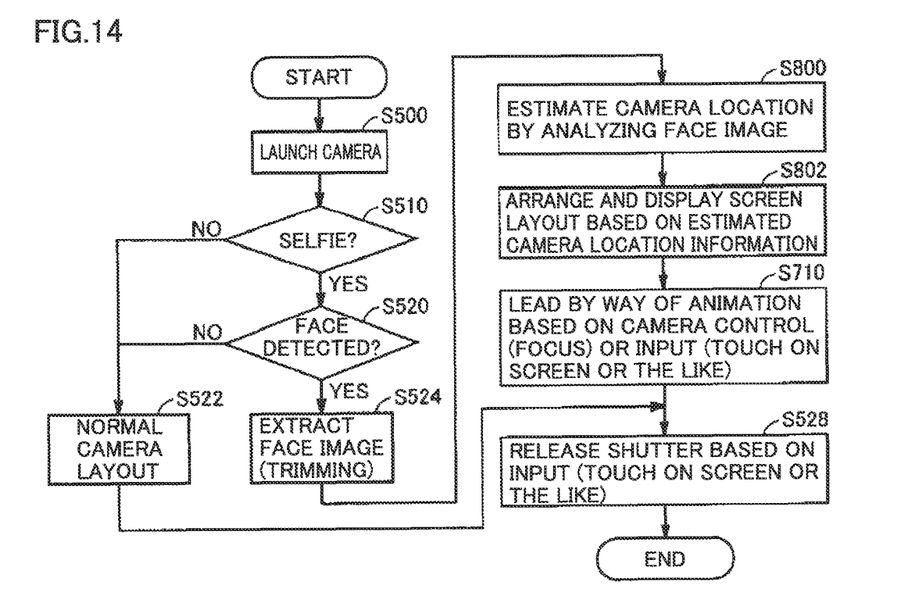
FIG. 14 is a flowchart showing part of a process performed by the smartphone according to the seventh embodiment.

With reference to FIG. 14, the following describes a control structure of smartphone 100F. FIG. 14 is a flowchart showing part of a process performed by smartphone 100F. The process of FIG. 14 is implemented by CPU 2 executing a program. In another aspect, part or all of the process may be performed by a circuit element or other hardware. It should be noted that in steps shown in FIG. 14, the same processes as those in the flowcharts shown in FIG. 4 and FIG. 11 are given the same step numbers. Hence, the same processes will not be repeatedly described.

In a step S800, CPU 2 serves as gaze detection unit 230 to detect the gaze of the user by analyzing the face image. CPU 2 serves as estimation unit 240 to estimate the camera location based on the detected gaze.

In a step S802, CPU 2 serves as display control unit 220 to arrange a screen layout based on the estimated camera location information and display the screen layout on monitor 5. In a certain aspect, CPU 2 displays an object (for example, a face image) on object display area 32 determined based on the estimated location of the camera, and displays on monitor 5 the live view obtained through the image capturing of the subject.

Eighth Embodiment

Figure 15:
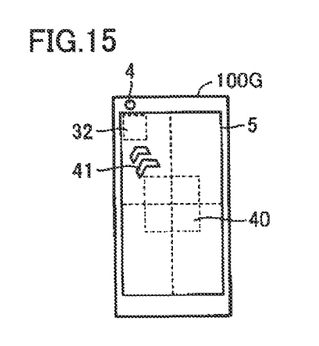
FIG. 15 shows a manner of display in a smartphone according to an eighth embodiment.

With reference to FIG. 15, the following describes an overview of a smartphone 100G according to an eighth embodiment. FIG. 15 shows a manner of display in smartphone 100G when a user is taking a selfie. Smartphone 100G is different from smartphone 100E according to the sixth embodiment in that animation 41 is started from center 40 of monitor 5 rather than the face location in the monitor image. The other points are the same as those in smartphone 100E according to the sixth embodiment, and therefore are not described repeatedly.

According to the present embodiment, since the animation is started from the center of monitor 5, animation 41 can be displayed without detecting the face image from the image, whereby the gaze of the user can be led to camera 4 using such a simpler functional configuration.

Ninth Embodiment

[Overview]

Figure 16:
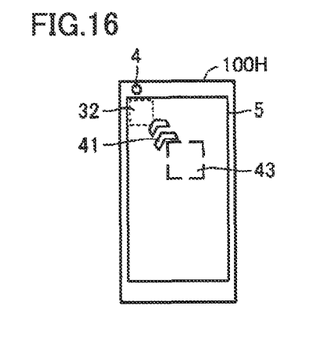
FIG. 16 shows a manner of display in a smartphone according to a ninth embodiment.

With reference to FIG. 16, the following describes an overview of a smartphone 100H according to a ninth embodiment. FIG. 16 shows a manner of display in smartphone 100H when a user is taking a selfie. Smartphone 100H is different from smartphone 100E according to the sixth embodiment in that animation 41 is started from a focus location 43 on monitor 5, rather than the face location in the monitor image. The other points are the same as those in smartphone 100E according to the sixth embodiment, and therefore are not described repeatedly.

According to the present embodiment, since the animation is started from focus location 43, animation 41 can be displayed without detecting the face image from the image, whereby the gaze of the user can be led to camera 4 using such a simpler functional configuration.

[Control Structure]

Figure 17:
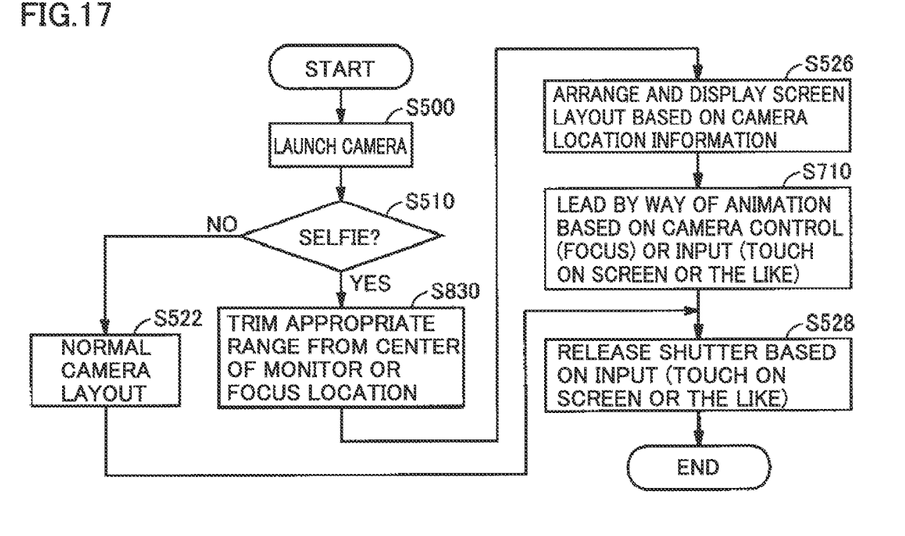
FIG. 17 is a flowchart showing part of a process performed by the smartphone according to the ninth embodiment.

With reference to FIG. 17, the following describes a control structure of smartphone 100H. FIG. 17 is a flowchart showing part of a process performed by smartphone 100H. The process of FIG. 17 is implemented by CPU 2 executing a program. In another aspect, part or all of the process may be performed by a circuit element or other hardware. It should be noted that in steps shown in FIG. 17, the same processes as those in the flowchart shown in FIG. 4, FIG. 7, FIG. 11, and FIG. 14 are given the same step numbers. Hence, the same processes will not be repeatedly described.

In a step S830, CPU 2 cuts out an appropriate range from the image displayed on monitor 5 as an image to be displayed on the object display area. For example, CPU 2 determines the following range as the range to be cut out: a certain range from the center of monitor 5; or a certain range from the focus location.

Tenth Embodiment

[Overview]

Figure 18:
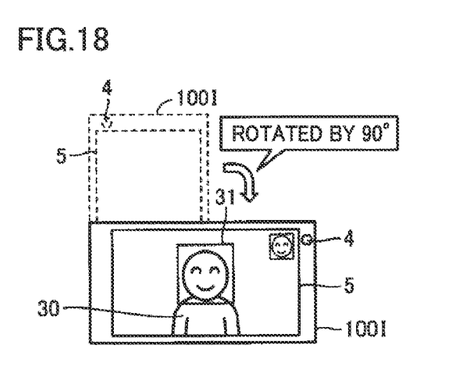
FIG. 18 shows a manner of display when a smartphone according to a tenth embodiment is turned by 90° while the user is taking a selfie.

With reference to FIG. 18, the following describes an overview of a smartphone 100I according to a tenth embodiment. FIG. 18 shows a manner of display when the user turns smartphone 100I by 90° while taking a selfie. Smartphone 100I is different from smartphone 100 according to the first embodiment in that a camera location is obtained in accordance with inclination of smartphone 100I. The other points are the same as those in smartphone 100 according to the first embodiment and therefore are not described repeatedly.

When the direction of the housing of smartphone 100I is changed, the location of the camera seen from the user is also changed. Hence, smartphone 100I obtains a camera location again in accordance with inclination of smartphone 100I, and then displays the object again. Smartphone 100I determines that an area on monitor 5 within a predetermined range from the camera location thus obtained again is a new object display area, and displays the object again on this new object display area.

Accordingly, the object can be displayed in the vicinity of camera 4 irrespective of the direction of inclination of smartphone 100I. That is, the image capturing function can be performed with the user looking directly at camera 4.

[Control Structure]

Figure 19:
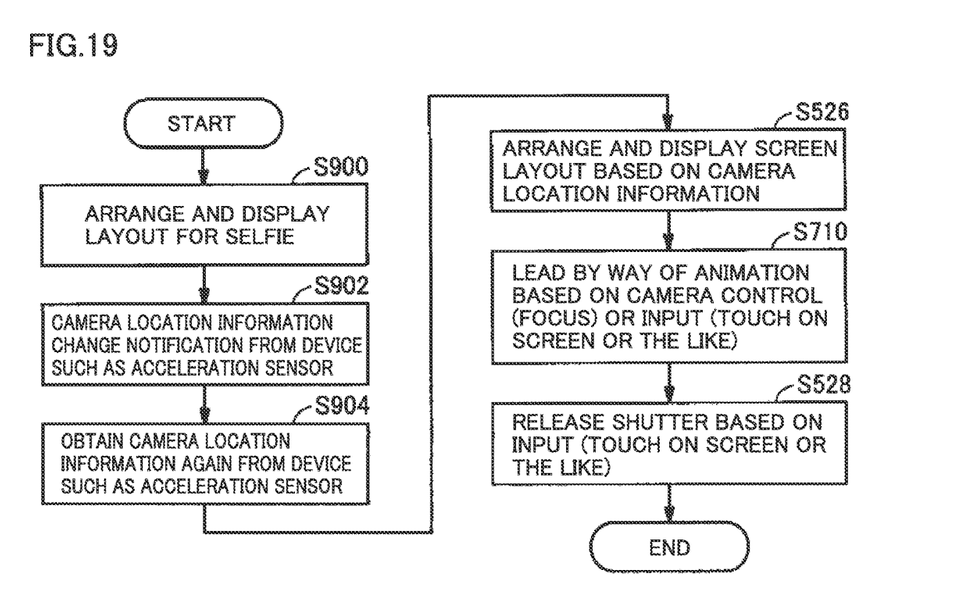
FIG. 19 is a flowchart showing part of a process performed by the smartphone according to the tenth embodiment.

With reference to FIG. 19, the following describes a control structure of smartphone 100I. FIG. 19 is a flowchart showing part of a process performed by smartphone 100I. The process of FIG. 19 is implemented by CPU 2 executing a program. In another aspect, part or all of the process may be performed by a circuit element or other hardware. It should be noted that in steps shown in FIG. 19, the same processes as those in the flowchart shown in FIG. 4, FIG. 7, FIG. 11, FIG. 14, and FIG. 17 are given the same step numbers. Hence, the same processes will not be repeatedly described.

In a step S900, CPU 2 arranges a layout for selfie, and displays the layout. In a step S902, CPU 2 obtains a change notification for camera location information from sensor 6 for detecting inclination of smartphone 100I (such as an acceleration sensor or an angular velocity sensor). It should be noted that CPU 2 may determine that the camera location has been changed when the information from the sensor becomes different from corresponding information in past.

In a step S904, CPU 2 obtains the camera location information from sensor 6 for detecting inclination of smartphone 100I. For example, based on a camera location in past, CPU 2 may specify the camera location in accordance with an inclination angle at which smartphone 100I is inclined by the user.

Eleventh Embodiment

[Overview]

Figure 20:
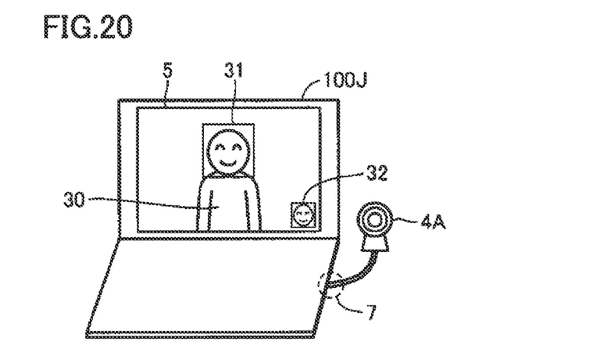
FIG. 20 shows a manner of display in a smartphone according to an eleventh embodiment.

With reference to FIG. 20, the following describes an overview of a smartphone 100J according to an eleventh embodiment. FIG. 20 shows a manner of display in smartphone 100J when a user is taking a selfie. Smartphone 100J is different from smartphone 100 according to the first embodiment in that a camera is connected as an external device. It should be noted that the hardware configuration of smartphone 100J is the same as the configuration shown in FIG. 2. Hence, the hardware configuration is not described repeatedly.

As shown in FIG. 20, smartphone 100J includes a camera I/F 7 to which an external camera device can be connected. A camera 4A serving as such an external device is connected to smartphone 100J via camera I/F 7. Camera 4A includes a Web camera and other electronic devices including an image capturing function. Camera 4A can specify the location of camera 4A by way of a sensor such as an acceleration sensor included in camera 4A, and outputs, to smartphone 100J, location information indicating the specified location. Smartphone 100J determines that the object display area is an area located on monitor 5 within a predetermined range from the location in the information output from camera 4A, and displays the object on the object display area.

In a certain aspect, smartphone 100J may be configured to specify the location of camera 4A in accordance with an appropriate protocol with camera 4A, and determine the object display area based on the location.

[Control Structure]

Figure 21:
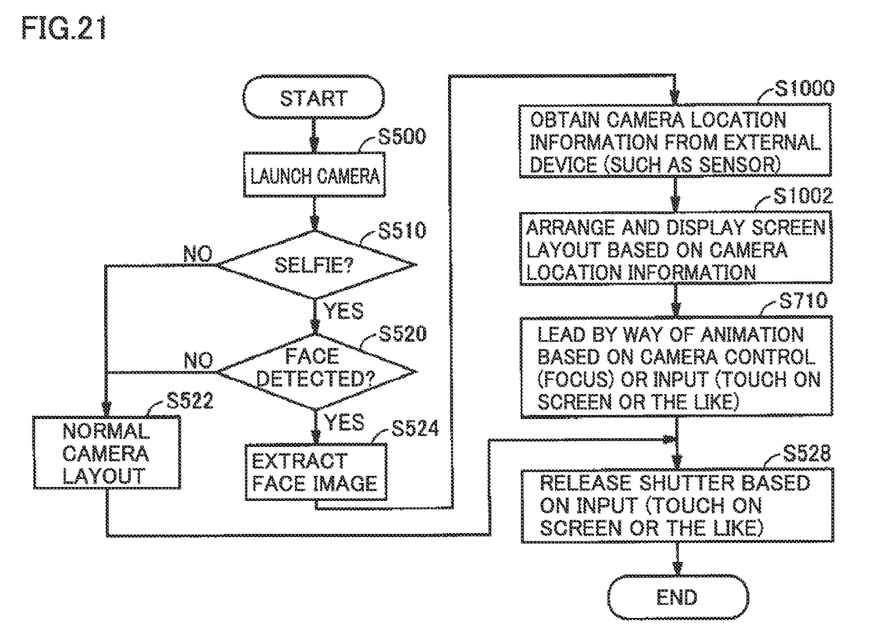
FIG. 21 is a flowchart showing part of a process performed by the smartphone according to the eleventh embodiment.

With reference to FIG. 21, the following describes a control structure of smartphone 100J. FIG. 21 is a flowchart showing part of a process performed by smartphone 100J. The process of FIG. 21 is implemented by CPU 2 executing a program. In another aspect, part or all of the process may be performed by a circuit element or other hardware. It should be noted that in steps shown in FIG. 21, the same processes as those in the flowchart shown in FIG. 4, FIG. 7, FIG. 11, FIG. 14, and FIG. 17 are given the same step numbers. Hence, the same processes will not be repeatedly described.

In a step S1000, CPU 2 obtains location information from camera 4A. In a step S1002, CPU 2 determines that the object display area is an area located on monitor 5 within a predetermined range from the location in the information output from camera 4A, and displays an object (for example, a face image) on the object display area.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: ROM; 2: CPU; 3: RAM; 4, 4A: camera; 5: monitor; 6: sensor; 7: camera I/F; 8: network I/F; 8A: antenna; 20: storage device; 21: camera location information; 30: user; 31: face location; 32: object display area; 35: animation; 37: arrow image; 38: icon; 39: button; 40: center; 43: focus location; 100, 100A to 100J: smartphone; 210: extraction unit; 220: display control unit; 230: gaze detection unit; 240: estimation unit.

The invention claimed is:

1. An electronic device comprising:

a monitor;

a camera provided at a display surface side of the monitor; and a processor that controls the electronic device, wherein the processor is configured or programmed to:

display, during image capturing of a subject by the camera, an object in a first display area on the monitor in order to lead a gaze of a user of the electronic device to the camera, the first display area being located within a predetermined range from a location of the camera of the electronic device, extract a face image of the user from the image obtained by the camera;

detect the gaze of the user at the electronic device, based on the face image;

determine an estimated location of the camera in the electronic device based on the gaze; and determine that the first display area is an area located on the monitor within the predetermined range from the estimated location of the camera, and display the object on the first display area.

2. The electronic device according to claim 1, wherein the processor is further configured or programmed to display, during the image capturing of the subject by the camera, the image obtained from the camera on a second display area different from the first display area, and displays, as the object, the face image on the first display area.

3. The electronic device according to claim 2, wherein during the image capturing of the subject by the camera, the processor is further configured or programmed to display an animation on a display area between the camera and a face location of the user in the image displayed on the second display area, in order to lead the gaze of the user from the face location toward the camera.

4. The electronic device according to claim 1, further comprising a storage device that stores the image obtained by the camera, wherein during the image capturing of the subject by the camera, the processor is further configured or programmed to display the image obtained from the camera on a second display area different from the first display area, and display a button on the first display area as the object, the button being configured to permit performance of an image capturing function to store the image obtained by the camera into the storage device.

* * * * *